United States Patent
Cook et al.

(10) Patent No.: US 6,598,509 B2
(45) Date of Patent: Jul. 29, 2003

(54) CUTTING TOOL TOOTH FORM INCLUDING SET TEETH WITH SURFACE FEATURES AND METHOD OF MAKING SAME

(75) Inventors: James Timothy Cook, Newton, AL (US); Peter Blauvelt Hopper, Lunenburg, MA (US)

(73) Assignee: Simonds Industries, Inc., Fitchburg, MA (US)

( * ) Notice: Subject to any disclaimer, the term of this patent is extended or adjusted under 35 U.S.C. 154(b) by 0 days.

(21) Appl. No.: 09/896,825

(22) Filed: Jun. 29, 2001

(65) Prior Publication Data

US 2003/0010177 A1 Jan. 16, 2003

(51) Int. Cl.⁷ ............................................. B27B 33/14
(52) U.S. Cl. ........................ 83/835; 125/13.01; 83/836
(58) Field of Search ............................. 125/13.01, 15, 125/22; 76/112; 83/835, 836–855; 407/29.1, 29.13

(56) References Cited

U.S. PATENT DOCUMENTS

| 2,637,355 A | * | 5/1953 | Chapin | |
| 4,011,783 A | | 3/1977 | Mobley | 83/846 |
| 4,423,553 A | | 1/1984 | Miyawaki | 30/355 |
| 4,557,172 A | | 12/1985 | Yoneda | 83/848 |
| 4,589,306 A | * | 5/1986 | Danielsson | 76/112 |
| 4,727,788 A | | 3/1988 | Yoshida et al. | 83/848 |
| 4,813,324 A | | 3/1989 | Yoshida et al. | 83/848 |
| 4,827,822 A | | 5/1989 | Yoshida et al. | 83/835 |
| 5,331,876 A | | 7/1994 | Hayden, Sr. | 83/661 |
| 5,410,935 A | * | 5/1995 | Holston et al. | 83/851 |
| 5,425,296 A | | 6/1995 | Kullmann et al. | 83/846 |
| 5,477,763 A | | 12/1995 | Kullman | 83/846 |
| 5,603,252 A | | 2/1997 | Hayden, Sr. | 83/851 |
| 6,257,226 B1 | * | 7/2001 | Hayden, Sr. | 125/22 |
| 2002/0029679 A1 | | 3/2002 | Cranna | 83/846 |

FOREIGN PATENT DOCUMENTS

WO    WO 98/07545    2/1998    .......... B23D/61/12

* cited by examiner

Primary Examiner—Derris H. Banks
Assistant Examiner—Jamila Williams
(74) Attorney, Agent, or Firm—Edwards & Angell, LLP; George W. Neuner, Esq.; Richard J. Roos, Esq.

(57) ABSTRACT

Disclosed are cutting blades for cutting tools and methods of making the blades. Such blades include tooth patterns with both set and non-set teeth. Each of the set teeth are set at an angle with respect to the jaw line of the blade, and each set tooth includes at least one surface feature that is effective to direct a portion of swarf that is produced via the cutting action of the blade into gullets of the blade such that less swarf overall is directed to the cutting surface of the objects being cut by the blade.

22 Claims, 3 Drawing Sheets

CUTTING TOOL TOOTH FORM INCLUDING SET TEETH WITH SURFACE FEATURES AND METHOD OF MAKING SAME

BACKGROUND OF THE INVENTION

1. Field of the Invention

This present invention relates to cutting blades, particularly to cutting blades having repeating patterns of teeth formed in sequence throughout the cutting blade and, more particularly, to cutting blades for use with power driven, wood cutting saws, wherein the blades have patterns of set teeth that include one or more surface features in order to promote the flow of swarf into the gullets of the blade rather than onto the surface of objects cut by the blade.

2. Description of Related Art

Cutting tools, such as power saws, have existed for many years, during which it has remained a goal for the saws to be able to cut objects (e.g., wood) quickly and uniformly, while allowing the saws to be safe and energy efficient.

Among the steps taken to reach this goal was to set some of the teeth of the cutting blades of such saws at an angle with respect to the jaw line and/or longitudinal axis of the blade. This causes the sharp tips of the set teeth to be exposed to the surface of the object(s) to be cut, and enables the blade to cut a width (i.e., "kerf") of the object(s) greater than the thickness of the blade, thus allowing for quicker, more efficient passage of the blade through the object(s).

FIG. 1 depicts an exemplary blade 10 for a power saw that includes a plurality of non-set teeth 12a, 12b and set teeth 14a, 14b. In this instance, the proximal set tooth 14a is set to the left with respect to a longitudinal axis 16 of the blade, while the distal set tooth 14b is set to the right with respect to the axis such that the set teeth 14a, 14b form a face angle, δ, of about −12°.

During cutting of a wood-based object with this cutting blade 10, swarf (e.g., sawdust or other cutting residue) is necessarily produced by the cutting action of the blade. As the cutting blade 10 continues to move in a proximal-to-distal direction while cutting the object, the swarf follows a path as shown by the small arrows depicted in FIG. 1.

Ideally, as much swarf as possible is kept away from the surface of the object that is being cut by the blade. This is because any swarf that contacts and adheres to the cutting surface of the object will interfere with the cutting action of the blade and, in turn, will necessarily impede the blade's ability to cut an object with maximum efficiency and/or uniformity.

The lack of uniformity of cuts produced by a blade is a significant problem in any usage environment because it results in finished products that possess unintended dimensions and/or unattractive appearances or surface finishes. And while the lack of efficiency of a cutting blade is disadvantageous in any usage environment, it is particularly problematic in high output environments (e.g., saw mills), where it results in marked increases in the amount of time needed to cut large quantities of objects, the amount of energy/power required to cut the objects and, in turn, in the service life of the blade itself.

Unfortunately, this blade 10 (and other blades like it), despite having a teeth arrangement as shown in FIGS. 1, 1A and 1B, have not proven effective in curbing the flow of swarf onto the cutting surface of the object(s) being cut.

Therefore, a need exists for a cutting blade, and a method of making such a blade, wherein the combination of the geometry and the surface features of the blade promotes a reduction in the incidence of swarf contacting and adhering to the surface of the object(s) being cut, so as to enable the cutting blade to provide for more quick, reliable and energy efficient cutting of such object(s), and for such object(s) to have a more attractive surface finish.

PUBLICATIONS

The following patents are related to the present invention as background information. The disclosures of each patent are hereby incorporated herein by reference in their entirety:

| | | |
|---|---|---|
| 4,011,783 | Mar. 15, 1977 | Circular Saw |
| 4,423,553 | Jan. 3, 1984 | Blade for a Saw and a Method for Manufacturing the Same |
| 4,557,172 | Dec. 10, 1985 | Saw Blade |
| 4,727,788 | Mar. 1, 1988 | Saw Blade |
| 4,813,324 | May 9, 1989 | Saw Blade |
| 4,827,822 | May 9, 1989 | Saw Blade |
| 5,331,876 | Jul. 26, 1994 | Saw Blade for Cutting Metal |
| 5,425,296 | Jun. 20, 1995 | Saw Blade |
| 5,477,763 | Dec. 26, 1995 | Saw Blade |
| 5,603,252 | Feb. 18, 1997 | Saw Blade |
| WO/98/07545 | Feb. 26, 1998 | Tooth Structure of Bandsaw Blade |

SUMMARY OF THE INVENTION

The present invention provides cutting blades for cutting tools and methods of making such blades. While the invention is primarily described with regard to wood cutting power driven saws, it is applicable to a variety of power driven cutting tools for cutting a variety of materials, such tools including, but not limited to, band saws, circular saws and portable saw mills, and such materials including, but not limited to, metals or alloys (e.g., steel).

In an exemplary aspect of the present invention, a cutting blade includes a repeating tooth pattern that is comprised of both set and non-set teeth. Preferably, this is a three-tooth pattern that comprises one non-set tooth, one tooth set to the left of the longitudinal axis of the blade and one tooth set to the right side of the longitudinal axis.

The set teeth form a positive face angle and a Y-shape about the longitudinal axis of the blade. This particular arrangement of set teeth is advantageous because it is less prone to cutting "off-square" as the teeth become dull.

Each of the set teeth of a blade in accordance with the present invention includes one or more surface features in order to reduce the disadvantageous incidence of swarf contacting and adhering to the surface of the object being cut by the blade. Each surface feature is located between the tip of a set tooth and the jaw line of the blade, preferably very close to the jaw line. The term "jaw line," as used herein, represents the physical center line/position of the blade.

Preferably, each of these surface features is, or has the appearance of, a positive surface feature, such as a notch, a step, a peak, a bump, a point, or a discontinuity. One, some or all of these surface features, however, may be, or may have the appearance of, a negative surface feature (e.g., a valley).

The presence of the surface feature(s) increases the likelihood that at least some of the swarf produced during the cutting process will be beneficially directed into one or more of the gullets present in the cutting blade in lieu of disadvantageously being directed into/onto the surface of the object being cut by the blade.

In an exemplary aspect of the present invention, at least some swarf travels down a tooth and impacts one or more surface features present on the tooth, thus slowing the downward descent of the swarf enough to allow the swarf to be caught in the gullet immediately proximal that particular tooth.

Once trapped within the gullet, the swarf will remain there until the blade goes around a wheel (thus causing the swarf to fall out of the gullets) and/or until air or brushes (or both) forcibly remove the collected swarf from the gullets and into/onto a collection area (e.g., the floor).

The present invention also provides methods of making cutting blades that include set teeth with one or more of such surface features.

In an exemplary aspect of a method of the present invention, some of the teeth of a preformed saw blade for a power driven cutting tool are caused to be "set" (i.e., bent and/or twisted at an angle) with respect to the longitudinal axis of the blade. A portion between the jaw line of the blade and the tip of each tooth is then ground using one or more grinding tools.

This grinding defines a surface remnant having the appearance of either a positive or negative surface feature and, preferably, also creates a grinding pattern (e.g., striations). These striations assist in causing swarf to be directed into gullets of the blade in accordance with the invention.

The methods according to the present invention are simple and inexpensive to implement, and result in cutting blades that are believed to be superior to comparable blades that are currently available.

In particular, the blades of the present invention reduce the problem of swarf accumulation on the surface of an object while that object is being cut by the blade.

Such accumulated swarf necessarily inhibits the blade's ability to cut objects with maximum efficiency such that comparatively more time, effort and (perhaps most importantly) more electrical power are required to cut the object as would be needed if the amount of swarf accumulation at the surface of the object being cut was reduced. The presence of swarf on the object being cut also tends to cause the blade to impart less uniform cuts to the object, which, in turn, results in the cut object having unintended dimensions and/or an unattractive appearance or surface finish.

By reducing the accumulation of swarf on the surface of the object being cut by a cutting blade, the present invention is effective in reducing the incidence of these, and other problems caused by such swarf accumulation.

DETAILED DESCRIPTION OF THE INVENTION

The present invention provides improved cutting blades for cutting tools (e.g., power driven wood cutting saws) and simple, yet improved methods of making the blades. These cutting blades include tooth patterns comprised of set and/or non-set teeth. The set teeth are set at an angle with respect to the longitudinal axis of the blade, and each set tooth includes at least one surface feature that is effective to direct a portion of swarf that is produced via the cutting action of the blade into gullets of the blade such that less swarf overall is directed to the cutting surface of the object(s) (e.g., wood) being cut.

Figure 2:
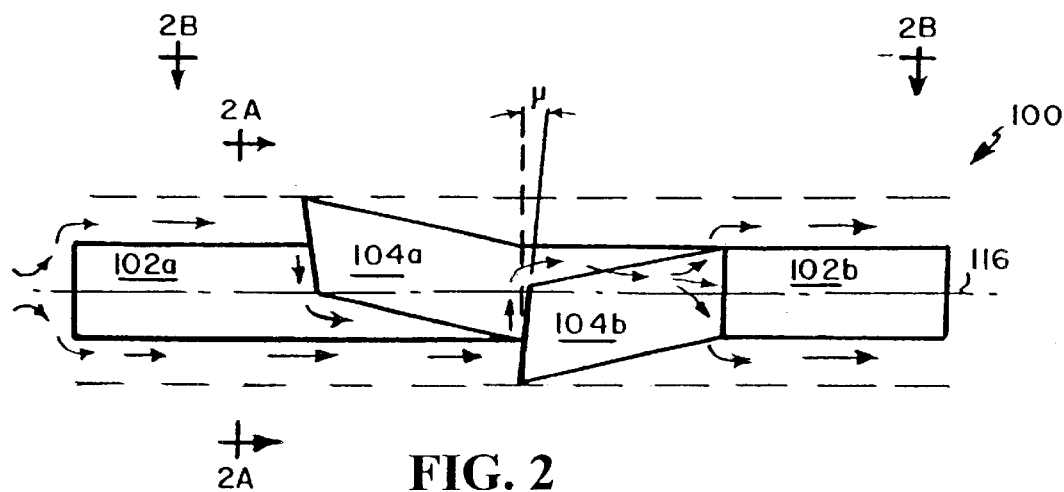
FIG. 2 illustrates a top view of a cutting blade in accordance with the present invention that includes a plurality of set and non-set teeth.

FIG. 2 depicts an exemplary cutting blade 100 in accordance with the present invention. This blade 100 includes a three-tooth pattern of one proximally located non-set tooth 102a, one proximally located set tooth 104a, and one distally located set tooth 104b.

This three-tooth pattern preferably recurs throughout the entirety of the blade. For example, the presence of the non-set tooth 102b signifies the recurrence of the pattern—that is, it is identical to the first tooth in the pattern, namely the non-set tooth 102a.

Although not shown, in accordance with this three tooth pattern the tooth located immediately proximal to non-set tooth 102a preferably is identical to the distally located set tooth 104b, while the tooth located immediately distal to non-set tooth 102b preferably is identical to the proximally located set tooth 104a.

It should be understood, however, that the cutting blade 100 may depart from this particular pattern at one or more predetermined areas or sections of the cutting blade while remaining within the scope of the present invention. By way of non-limiting examples, the pattern may include greater or fewer than three teeth, the blade may include only set teeth (i.e., no non-set teeth), and/or the blade may include greater or fewer adjoining/consecutive set teeth or non-set teeth than the blade depicted in FIG. 2.

Figure 1:
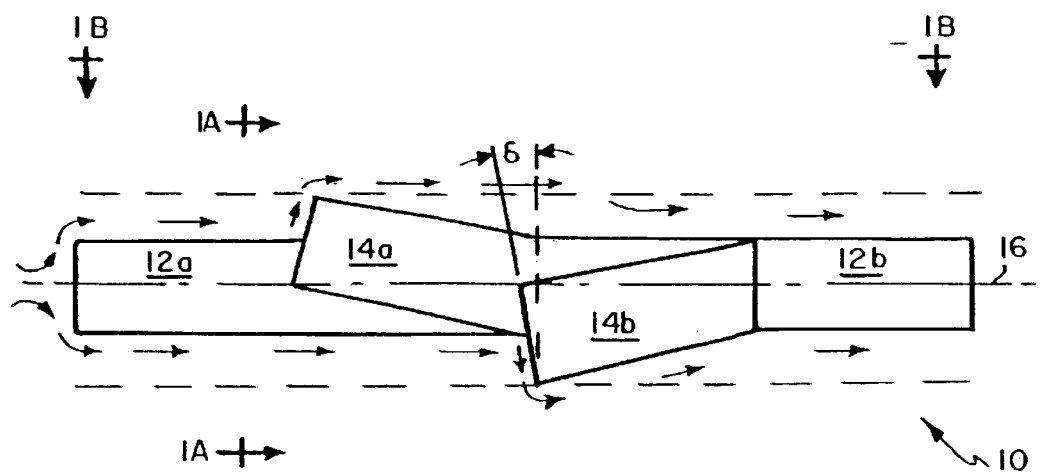
FIG. 1 illustrates a top view of a prior art cutting blade that includes a plurality of set and non-set teeth.

In this instance, the proximal set tooth 104a is set to the left with respect to the longitudinal axis 116 of the blade 100, while the distal set tooth 104b is set to the right with respect to the longitudinal axis such that the set teeth 104a, 104b form a positive face angle, $\mu$, of approximately 7°, as compared to the 12° negative face angle, $\delta$, formed by the set teeth 14a, 14b of the blade 10 of FIG. 1.

Figure 1A:
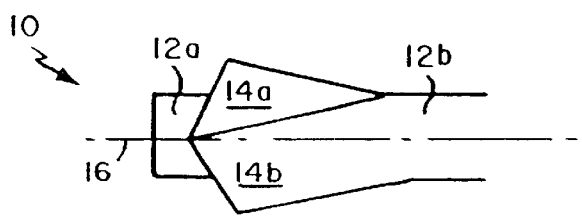
FIG. 1A illustrates a view of the cutting blade of FIG. 1 in the direction of the line A—A of FIG. 1.
Figure 2A:
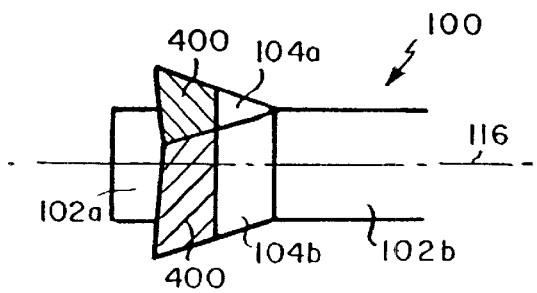
FIG. 2A illustrates a view of the cutting blade of FIG. 1 in the direction of the line A—A of FIG. 2.

The difference between the face angles of the blade 10 of FIG. 1 and the blade 100 of FIG. 2 is best shown by reference to FIGS. 1A and 2A, which indicate, respectively, that the face angle of the set teeth 14a, 14b of the blade 10 cause those set teeth to form a dome-like shape, while the face angle of the set teeth 104a, 104b of the blade 100 cause those set teeth to form a Y-shape.

The shape of the set teeth 14a, 14b of the blade 10 of FIG. 1 is disadvantageous because as the set teeth 14a, 14b become dull, their dome-like shape renders them more likely to cut "off square," wherein the teeth veer off to the side of the longitudinal axis 116 during the cutting process. If such veering occurs, the blade 10 will produce moderately to highly non-uniform, sub-optimal cuts. Moreover, this veering, if undetected, could eventually cause the blade 10 to fail during operation, which, in turn, could cause damage to the tool to which the blade is attached, and/or to any persons or property in the immediate vicinity of the blade.

The Y-shaped set teeth 14a, 14b of the blade 100 of FIG. 2A are less prone to this veering problem and, therefore, are preferred.

Referring again to FIGS. 1 and 2, these blades 10, 100 (when attached to cutting tools such as power driven cutting saws) cut an object by having their teeth move at a predetermined velocity in a proximal-to-distal direction through the object. This predetermined velocity is generally in the range of about 50 surface feet per minute to 8000 surface feet per minute, with a range of about 1000 surface feet per minute to 8000 surface feet per minute being typical, and a rate of about 4000 surface feet per minute being preferred for power driven wood cutting saws.

When the blade 100 is used to cut an object (e.g., wood or metal-based), swarf is necessarily produced during the cutting process. As indicated above, it is disadvantageous for swarf to adhere to the surface of the object being cut.

Figure 2B:
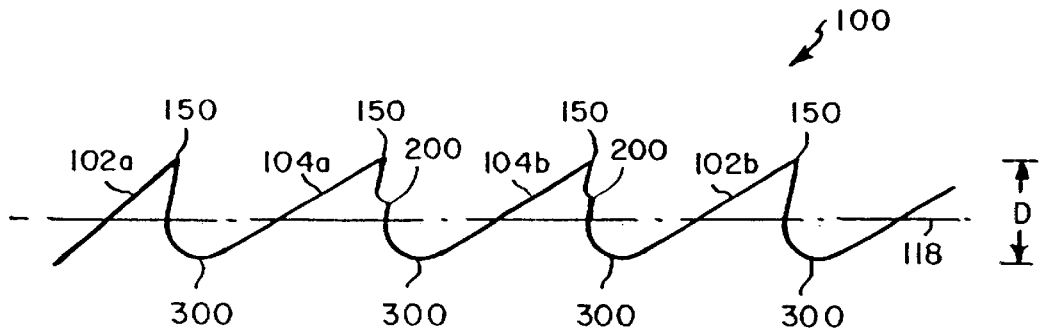
FIG. 2B illustrates a view of the cutting blade of FIG. 1 in the direction of the line B—B of FIG. 2, wherein the illustrated view depicts the presence of at least one positive surface feature that has been ground into the cutting face of at least one tooth of the cutting blade.
Figure 2C:
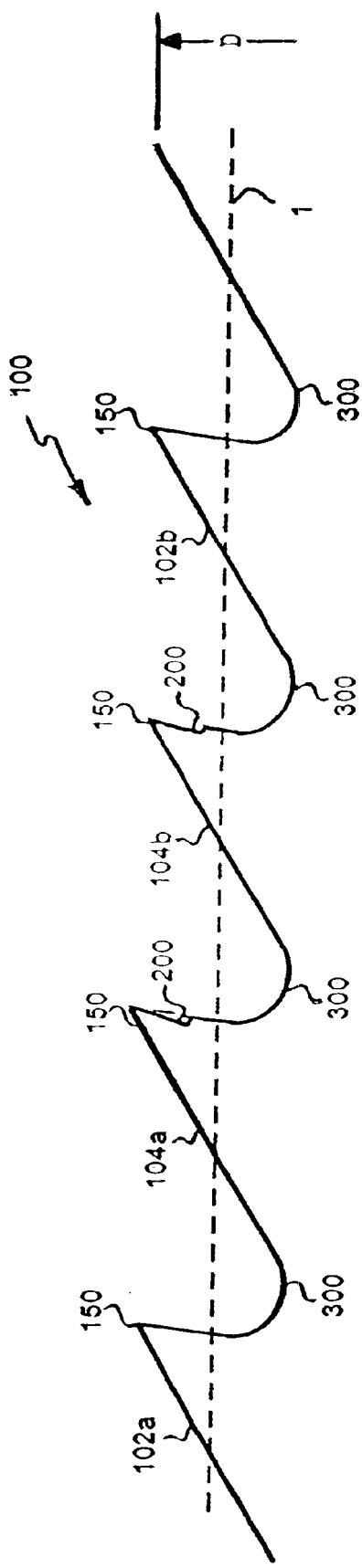
FIG. 2C illustrates an alternate embodiment of FIG. 2C wherein at least one negative surface feature has been ground into the cutting face of at least one tooth of the cutting blade.

In order to reduce the incidence of this disadvantageous condition, one or more of the set teeth 104a, 104b of the blade 100 of FIG. 2 include at least one surface feature 200, as best shown in the FIG. 2B view of the blade 100.

Although the blade 100 is depicted as including one surface feature 200 on each set tooth 104a, 104b, and no surface features on each non-set tooth 102a, 102b, the number of surface features on each tooth may vary without departing from the scope of the present invention. By way of non-limiting examples, one or more set teeth 104a, 104b need not include surface features 200, and/or one or more set teeth need not include the same number of surface features as the other set teeth, and/or one or more non-set teeth 102a, 102b also may include one or more surface features in addition to, or in lieu of, those included on the set teeth.

These surface features 200 generally are, or have the appearance of, positive surface features, with a preferred shape for the positive surface feature being that of a step, notch, peak, bump, point, discontinuity or the like. It is understood, however, that one, some, or all of surface features 200 may have different shapes than those shown in FIG. 2B without departing from the scope of the present invention. Moreover, it is further understood that one, some or all of the surface features 200 may be, or have the appearance of, negative surface features.

The surface feature(s) 200 generally are located in the range of about 0.001 inches to 0.01 inches above the jaw line 118 of the blade 100. The jaw line 118 is located at a position in the range of about 10% to about 80% of the overall distance, D (see FIG. 2B), from the tip 150 of each tooth to the lowest point of a gullet 300. Thus, by way of non-limiting example, if the distance, D, is 0.2 inches, the jaw line 118 is generally located anywhere from 0.02 inches to 0.160 inches below the tip 150 of each tooth.

Preferably, the jaw line 118 of the blade 100 is located in the range of about 0.05 to 0.25 inches (more preferably 0.10 to 0.15 inches, most preferably 0.125 to 0.14 inches) below the tip 150 of each blade tooth. Therefore, in an embodiment in which the jaw line 118 of the blade 100 is located 0.14 inches below the tips of each blade tooth, each surface feature 200 is preferably located about 0.139 to 0.130 inches below the tip of each tooth on which it/they are included.

Due to the geometry of the set teeth 104a, 104b, their orientation with respect to the longitudinal axis 116 and the jaw line 118 of the blade 100, as well as the shape and location of the surface feature(s) 200, the likelihood that at least some of the swarf produced during the cutting process will be beneficially directed into one or more of the gullets 300 present in the cutting blade 100 is increased.

Swarf produced by the cutting action of the blade 100 travels in various directions upon being produced. Some swarf is beneficially cast away from both the blade and the object being cut. At least some swarf, however, stays in contact with the tooth that produced the swarf.

If, as with set tooth 14b of the blade 10 of FIG. 1, this tooth does not include a surface feature, at least some of the swarf would proceed to travel down the tooth 14b, and then toward and past the jaw line 18. In that case, because the blade 10 is moving in a proximal-to-distal direction at a predetermined rate (i.e., a standard cutting rate of 4000 surface feet per minute), the swarf will travel below the jaw line 18 before the gullet 30 located immediately proximal to the set tooth 14b that cut the swarf can catch/trap the swarf. And because it is not caught by that (or any other) gullet 30, the swarf is more likely to encounter and adhere to the cutting surface of the object being cut, which is a disadvantageous occurrence for the reasons outlined above.

The presence of the surface feature(s) 200 on the set teeth 104a, 104b of the blade 100 causes more swarf to be directed into gullets 300 as compared to the prior art blade 10. This occurs because the path of the swarf down a set tooth 104a, 104b of the blade 100 of FIG. 2 is not uninterrupted as is the case with swarf that comes into contact with the set teeth 14a, 14b of FIG. 1, but rather is impeded by impacting the surface feature(s) 200 defined on a set tooth (e.g., set tooth 104b). The force of this impact necessarily slows the swarf's downward descent enough that, as it falls downward, the swarf is likely to encounter, and become caught/trapped within, the gullet 300 located immediately proximal to the set tooth 104a, 104b that cut the swarf.

Once trapped within one or more gullet 300, the swarf will remain there until the blade 100 leaves the object and goes around a wheel, thus causing the swarf to fall out of the gullets 300 in which it is retained and into/onto a collection area (e.g., the floor). Alternatively or additionally, the blade 100 can be cleaned of swarf by air and/or brushes, each of which forcibly removes the collected swarf from gullets 300 and into/onto a collection area (e.g., the floor).

The present invention also provides methods of making cutting blades 100 that include set teeth 104a, 104b with one or more surface features 200. In accordance with such methods, a standard, pre-formed blade 100 is provided.

Exemplary pre-formed saw blades of various dimensions, weights, and sharpnesses for various power driven cutting tools are available from many commercial suppliers including, but not limited to, Simonds Industries, Inc. of Fitchburg, Mass., USA. One such exemplary blade (which is described in U.S. patent Ser. No. 09/358,211, the disclosure of which is expressly incorporated by reference in its entirety) is a cutting blade wherein each tooth is made of steel (as can be the rest of the blade), but wherein the tips of some or all of the teeth are made of carbide (or, alternatively, made of Stellite or a high speed steel).

A predetermined pattern of teeth 104a, 104b are then caused to be "set" (i.e., bent and/or twisted at an angle) with respect to the longitudinal axis 116 of the blade 100. As noted above, this pattern is preferably repeated throughout the entirety of the blade. The actual setting of the teeth 104a, 104b can be accomplished via techniques known in the art, e.g., through the use of a setting die.

Alternatively, some or all of the set teeth may be already be set on the pre-formed blade, thus reducing (or entirely eliminating) the need to actually set some or all of the teeth that are desired to be set.

Figure 1B:
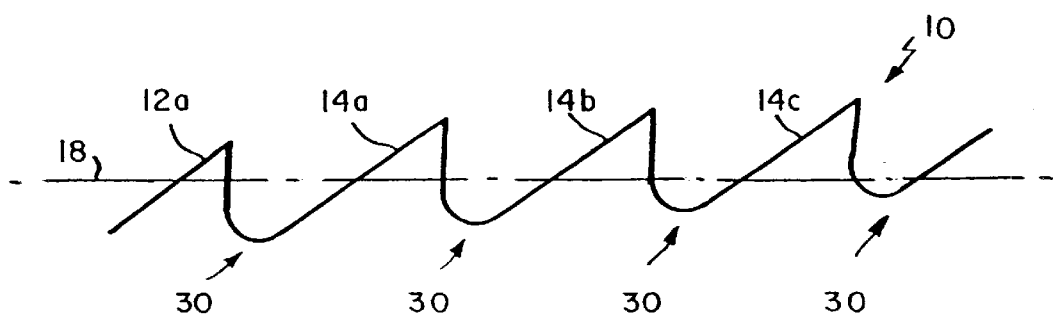
FIG. 1B illustrates a view of the cutting blade of FIG. 1 in the direction of the line B—B of FIG. 1.

Each tooth that is to possess one or more surface features 200 is then ground using one or more grinding tools. In an exemplary embodiment of the present invention, a portion of each tooth located between the tip 150 of the tooth and the jaw line 118 is ground so as to create a notch/tooth above the jaw line as shown on set teeth 104a, 104b of FIG. 1B.

The amount of the tooth that is ground may vary; however, each tooth is generally ground to a depth in the range of about 0.001 to 0.02 inches.

In a preferred embodiment of the present invention, each tooth 104a, 104b that is to include a surface feature 200 is ground via a grinding wheel. The grinding wheel generally has a diameter in the range of about 2 inches to 6 inches, with a diameter in the range of about 3 inches to 5 inches being preferred, and a diameter of in the range of about 4 inches to 5 inches being most preferred.

The grinding wheel is preferably a cubic boron nitride (CBN) grinding wheel, but other types of grinding wheels including, but not limited to, diamond grinding wheels, also are suitable for use in practicing this method in accordance with the present invention.

The teeth 104a, 104b are ground so as to form striations 400 on the surface of the teeth. Although these striations are preferably semi-circular in shape (as shown in FIG. 2A), they may have other shapes including, but not limited to, substantially linear.

These striations 400, besides assisting in creating the surface feature(s) 200, also assist in causing swarf to be directed to gullets 300 of the blade 100 in accordance with the invention. Cut swarf that impacts the rough texture of the striations 400 will be more likely to temporarily adhere to the striations, and, in turn, will be more likely to fall downward from the tooth and into a gullet 300 of the blade 100 as discussed above. In the absence of the striations 400, a larger quantity of the swarf that actually contacts the teeth will simply impact and bounce off the teeth of the blade 100, after which the swarf will likely contact and disadvantageously adhere to the surface of the object being cut by the blade.

Another aspect of the blade 100 that assists in causing swarf to be directed to the gullets 300 is fact that the teeth 104a, 104b that are set at an angle above the jaw line 118 are not angled below the jaw line, i.e., have an angle of 0° (zero degrees) below the jaw line. The transitioning of these set teeth 104a, 104b from being angled above the jaw line 118 to non-angled below the jaw line renders the teeth better dimensioned to catch swarf, which is then directed into the gullets 300 as discussed above.

The foregoing description of the invention is merely illustrative thereof, and it is understood that variations and modifications can be effected without departing from the scope or spirit of the invention as set forth in the following claims. All documents mentioned herein are incorporated by reference herein in their entirety.

What is claimed is:

1. A cutting blade for a power driven cutting tool, comprising:
   a jaw line;
   a plurality of set teeth, wherein each set tooth includes a tooth face and further includes a tip located a predetermined distance above the jaw line, and wherein at least two of the plurality of set teeth are set in different directions with respect to a longitudinal axis of the cutting blade such that each of the at least two of the plurality of set teeth forms a positive face angle; and
   at least one surface feature ground into the cutting face of at least one of the plurality of set teeth, wherein each surface feature is located between the tip of the tooth on which it is defined and the jaw line of the blade.

2. The blade of claim 1, wherein at least two of the plurality of set teeth are set in different directions with respect to the jaw line.

3. The blade of claim 1, wherein the blade further includes a plurality of non-set teeth that are substantially aligned with the jaw line; and wherein the plurality of set teeth and the plurality of non-set teeth together form a predetermined pattern that repeats itself throughout at least a portion of the blade.

4. The blade of claim 3, wherein the pattern includes at least two adjoining set teeth.

5. The blade of claim 4, wherein the pattern consists of a first non-set tooth, a first set tooth located immediately distal to the first non-set tooth, and a second set tooth located immediately distal to the first set tooth.

6. The blade of claim 5, wherein the first set tooth is set to the left of the jaw line and the second set tooth is set to the right of the jaw line.

7. The blade of claim 6, wherein the first set tooth and the second set tooth form a Y-shape about the jaw line.

8. The blade of claim 1, wherein the surface feature is a positive surface feature.

9. The blade of claim 8, wherein the positive surface feature is selected from the group consisting of a notch, a step, a peak, a bump, a point, and a discontinuity.

10. The blade of claim 1, wherein each surface feature is located a distance in the range of about 0.001 to 0.01 inches above the jaw line.

11. The blade of claim 1, wherein the blade includes a plurality of gullets, and wherein the jaw line is located in the range of about 10% to 80% of the overall distance between the tips of the set and non-set teeth and a lowest point of the gullets.

12. The blade of claim 11, wherein the jaw line is located about 0.14 below the tips of the set and non-set teeth.

13. The blade of claim 1, wherein each of the set teeth on which a surface feature is defined includes a grinding pattern on at least a portion of the tooth located between the tip of the tooth and the surface feature.

14. The blade of claim 13, wherein the grinding pattern includes grinding striations.

15. The blade of claim 13, wherein the grinding pattern is selected from the group consisting of a semi-circular pattern and a substantially linear pattern.

16. The cutting blade of claim 1, wherein at least one of the at least one surface feature is a negative surface feature.

17. A cutting blade for a power driven cutting tool, comprising:
   a jaw line;
   a pattern of teeth, wherein each tooth includes a tip located a distance above the jaw line, the pattern including:
      a plurality of teeth set at an angle with respect to the jaw line, at least two of the set teeth being set to different sides of the jaw line, and
      a plurality of non-set teeth, each of which is substantially aligned with the jaw line;
   at least one surface feature defined on at least one of the plurality of set teeth, wherein each surface feature is located between the tip of the tooth on which it is defined and the jaw line of the blade; and a predetermined grinding pattern defined between each surface feature and the tip of each tooth on which a surface feature is defined.

18. The cutting blade of claim 17, wherein at least one of the at least one surface feature is a negative surface feature.

19. A cutting blade for a power driven cutting tool, comprising:

a jaw line;

a plurality of teeth set at an angle with respect to the jaw line, wherein each set tooth includes a tip located a predetermined distance above the jaw line; and at least one surface feature defined on at least one of the plurality of set teeth, wherein each surface feature is located between the tip of the tooth on which it is defined and the jaw line of the blade, and wherein each of the set teeth on which a surface feature is defined includes a grinding pattern on at least a portion of the tooth located between the tip of the tooth and the surface feature.

20. The blade of claim 19, wherein the grinding pattern includes grinding striations.

21. The blade of claim 19, wherein the grinding pattern is selected from the group consisting of a semi-circular pattern and a substantially linear pattern.

22. The cutting blade of claim 19, wherein at least one of the at least one surface feature is a negative surface feature.

* * * * *